(12) United States Patent
Berthoud

(10) Patent No.: US 9,033,277 B2
(45) Date of Patent: May 19, 2015

(54) COUNTERBALANCE MECHANISM FOR BOTTOM-HINGED AIRCRAFT FUSELAGE DOORS

(71) Applicant: EMBRAER S.A., São José dos Campos-SP (BR)

(72) Inventor: Marcelo Berthoud, São José dos Campos-SP (BR)

(73) Assignee: EMBRAER S.A., São José dos Campos-SP (BR)

( * ) Notice: Subject to any disclaimer, the term of this patent is extended or adjusted under 35 U.S.C. 154(b) by 182 days.

(21) Appl. No.: 13/682,607

(22) Filed: Nov. 20, 2012

(65) Prior Publication Data

US 2014/0138488 A1 May 22, 2014

(51) Int. Cl.
*B64C 1/14* (2006.01)
*E05D 13/00* (2006.01)

(52) U.S. Cl.
CPC ............ *B64C 1/1407* (2013.01); *E05D 13/123* (2013.01)

(58) Field of Classification Search
CPC ............................. B64C 1/1415; B64C 1/1407
USPC ............ 244/118.3, 129.5, 129.6; 49/386, 387
See application file for complete search history.

(56) References Cited

U.S. PATENT DOCUMENTS

| | | | | | |
|---|---|---|---|---|---|
| 2,531,263 | A | * | 11/1950 | Fink et al. | 182/97 |
| 4,014,486 | A | * | 3/1977 | Nelson et al. | 244/129.6 |
| 4,086,726 | A | * | 5/1978 | Moses | 49/37 |
| 4,176,812 | A | * | 12/1979 | Baker | 244/129.5 |
| 4,601,446 | A | * | 7/1986 | Opsahl | 244/129.5 |
| 5,636,814 | A | * | 6/1997 | Rollert | 244/129.5 |
| 5,704,569 | A | | 1/1998 | Daniels | |
| 7,677,494 | B2 | * | 3/2010 | Yada et al. | 244/118.3 |
| 8,157,215 | B2 | * | 4/2012 | Yada et al. | 244/129.5 |
| 2008/0099605 | A1 | * | 5/2008 | Yada et al. | 244/118.3 |
| 2010/0127124 | A1 | * | 5/2010 | Yada et al. | 244/118.3 |

\* cited by examiner

*Primary Examiner* — Philip J Bonzell
(74) *Attorney, Agent, or Firm* — Nixon & Vanderhye P.C.

(57) ABSTRACT

A counterbalance mechanism for counterbalancing weight of a bottom-hinged door (such as a clamshell-type airstair door of an aircraft) includes an operator handle, a hoist rod pivotally connected at one end to the operator handle and at an opposite end thereof to the door near a bottom region thereof. A force accumulator assembly is provided which includes a force biasing member which accumulates and dissipates a bias force when opening and closing the door, respectively, to provide mechanical counterbalance to the weight of the door. A bellcrank assembly operatively connects the operator handle to the force accumulator. In such a manner, weight counterbalancing of the door is achieved.

23 Claims, 5 Drawing Sheets

COUNTERBALANCE MECHANISM FOR BOTTOM-HINGED AIRCRAFT FUSELAGE DOORS

FIELD

The embodiments disclosed herein relate generally to counterbalance mechanisms for bottom-hinged doors, especially bottom-hinged clamshell-type aircraft fuselage doors (e.g., airstair doors).

BACKGROUND

Bottom-hinged, clamshell-type aircraft fuselage doors that integrally include steps to allow passengers to board and disembark when the door is opened are colloquially known as "airstair" doors. Aircraft provided with airstair doors can thus provide service to many less populated airport environments since a fixed-based gantry platform to allow passengers to board and disembark is not necessarily required. For these reasons, many regional transport and general aviation aircraft are equipped with airstair fuselage doors.

Since aircraft fuselage doors are bottom hinged, some form of weight counterbalance mechanism is typically required to assist an operator (typically on-board personnel) to open and close the door. Various mechanisms based on hydraulic, electric or spring actuation concepts are therefore known and used in aircraft designs. In the case of hydraulic actuation, for example, systems are known which possess substantial load capacities and relatively simplistic operational modes, including automated push-button door opening and closing. Similar automated operations based on electric motor actuation systems are also known whereby an electrical actuator or motor performs the door movement. However, there are actuation cycle limitations imposed on both hydraulic and electric actuation concepts due to the necessary recharge of hydraulic accumulators and/or on-board batteries that are required for proper operation. In addition, there are substantial space penalties associated with the incorporation of hydraulic and electric door actuation mechanisms that may preclude their being used on certain types of aircraft designs.

U.S. Pat. No. 5,704,569 to Daniels (the entire content of which is expressly incorporated hereinto by reference) describes a mechanical counterbalance mechanism for upwardly and inwardly operated aircraft cargo doors. The counterbalance mechanism as disclosed therein includes a guide tube having a rod that extends outwardly therefrom and compression springs which oppose the outward movement of the rod. A linkage system includes a bellcrank and a push rod which connects the guide tube to the cargo door to assert a counterbalancing force during door opening and closing.

While the counterbalance mechanism as described in the Daniels '569 patent is suitable for upwardly and inwardly operated cargo doors, it is not conveniently adapted for use with cargo airstair doors. Therefore, there exists continued need for a counterbalancing mechanism that may be employed for bottom-hinged clamshell-type aircraft airstair doors. It is therefore towards providing solutions to such a need that the embodiments of the present invention are directed.

SUMMARY

The disclosed embodiments herein are directed toward counterbalance mechanisms which, in some embodiments, are especially adapted for counterbalancing bottom-hinged clamshell-type aircraft doors, e.g., airstair doors.

According to some disclosed embodiments, counterbalance mechanism for counterbalancing weight of a bottom-hinged door (such as a clamshell-type airstair door of an aircraft) includes an operator handle, a hoist rod pivotally connected at one end to the operator handle and at an opposite end thereof to the door near a bottom region thereof. A force accumulator assembly is provided which includes a force biasing member which accumulates and dissipates a bias force when opening and closing the door, respectively, to provide mechanical counterbalance to the weight of the door. A bellcrank assembly operatively interconnects the operator handle to the force accumulator as an inverse parallelogram linkage. In such a manner, rotational movement of the operator handle in one of counterclockwise and clockwise directions is applied to one end of the bellcrank assembly and is translated into opposite rotational directions of the other end of the bellcrank assembly so as to load and unload spring force on a force biasing member associated with a force accumulator.

In some embodiments, the bellcrank assembly will include first, second and third bellcranks, with the first and second bellcranks operatively connected by a linkage arm. Thus, rotational movement of the operator handle in one rotational direction will be transferred to the first bellcrank of the bellcrank assembly and translated into an opposite rotational movement of second and third bellcranks of the bellcrank assembly to thereby cause respective loading or unloading of biasing force of the force biasing member. As such, weight counterbalancing of the door is achieved.

According to some embodiments, the biasing member comprises a compression spring. If employed, the compression spring may be mounted between lower and upper spring caps.

The force accumulator in certain embodiments may comprise a piston assembly, with a compression spring coaxially surrounding the piston assembly.

The bellcrank assembly according to some embodiments may comprise a fixed-position lower bearing block having a lower bearing shaft, wherein an end of each of the operator handle and the first bellcrank is fixed to the lower bearing shaft so the operator handle and the first bellcrank rotate as a unit with one another and with the lower bearing shaft. According to other embodiments, the bellcrank assembly may additionally or alternatively comprise a fixed position upper bearing block having an upper bearing shaft, wherein respective ends of the second and third bellcranks are fixed to the upper bearing shaft so the second and third bellcranks rotate as a unit with one another and with the lower bearing shaft.

Aircraft having bottom-hinged clamshell-type airstair doors may be retrofitted by installing a counterbalance mechanism according to the embodiments disclosed herein and thereafter operatively interconnecting the counterbalance mechanism with the door.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1A:
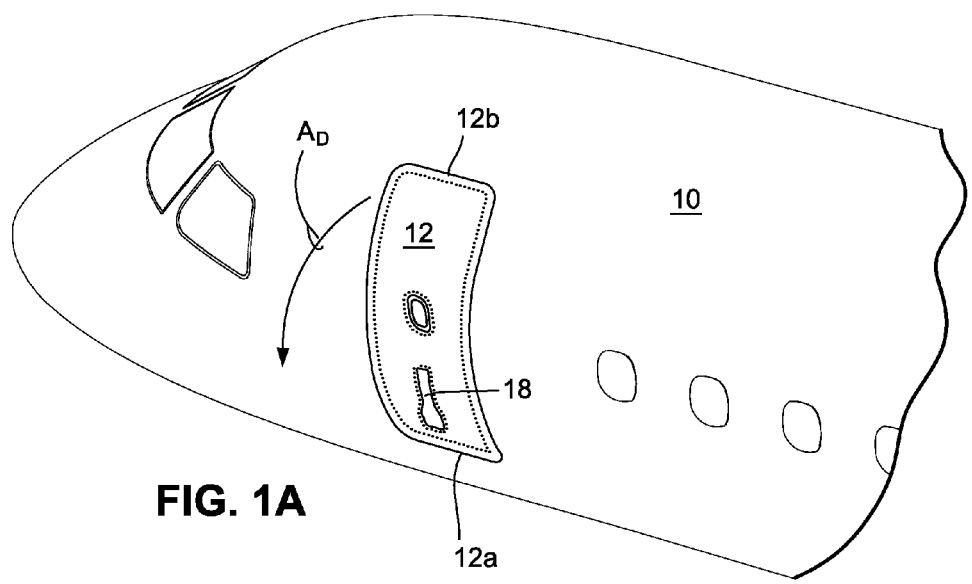
FIGS. 1A and 1B are exterior perspective views of a forward aircraft fuselage showing the airstair door in closed and opened positions, respectively.
Figure 1B:
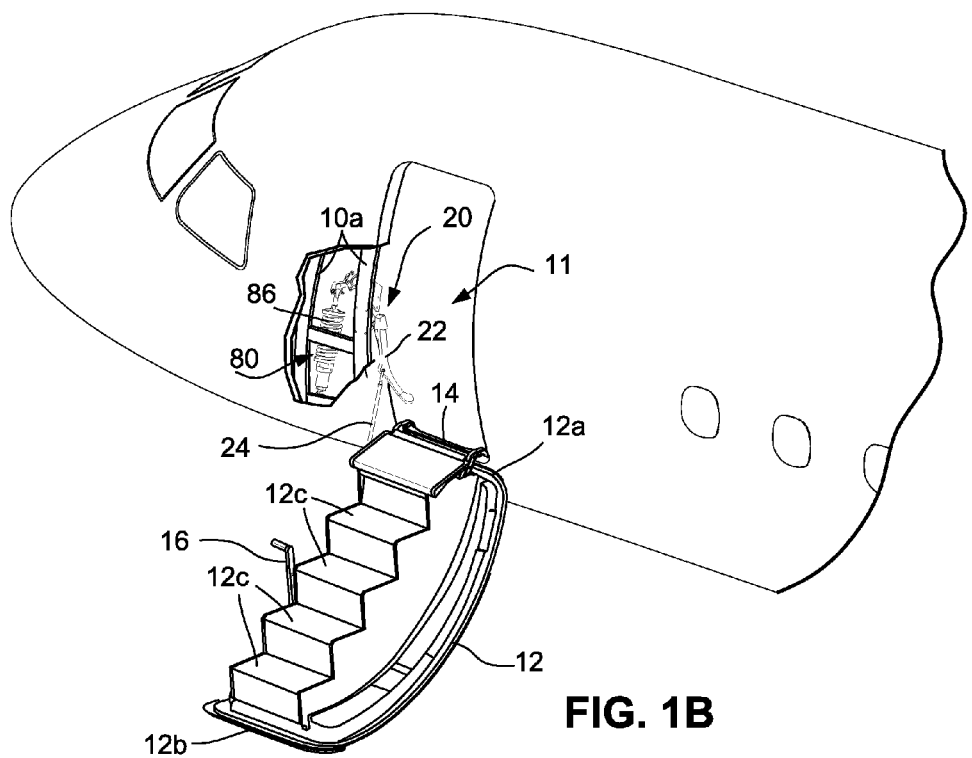

Accompanying FIGS. 1A and 1B are exterior perspective views of a forward section of an aircraft fuselage 10 equipped with a bottom-hinged, clamshell-type airstair door 12 shown in closed and opened positions, respectively. As is conventional, the airstair door 12 is equipped with a hinge assembly 14 located at the lower end 12a of the door. A series of steps 12c are provided between the lower end 12a and the upper end 12b of the door 12 which allow passengers and crew to board and disembark from the aircraft fuselage 10 when the door 12 is in its opened position (i.e., when the door 12 is pivoted in the direction of the arrow $A_D$ in FIG. 1A so the upper end 12b of the door 12 is near the ground as depicted in FIG. 1B).

Figure 2:
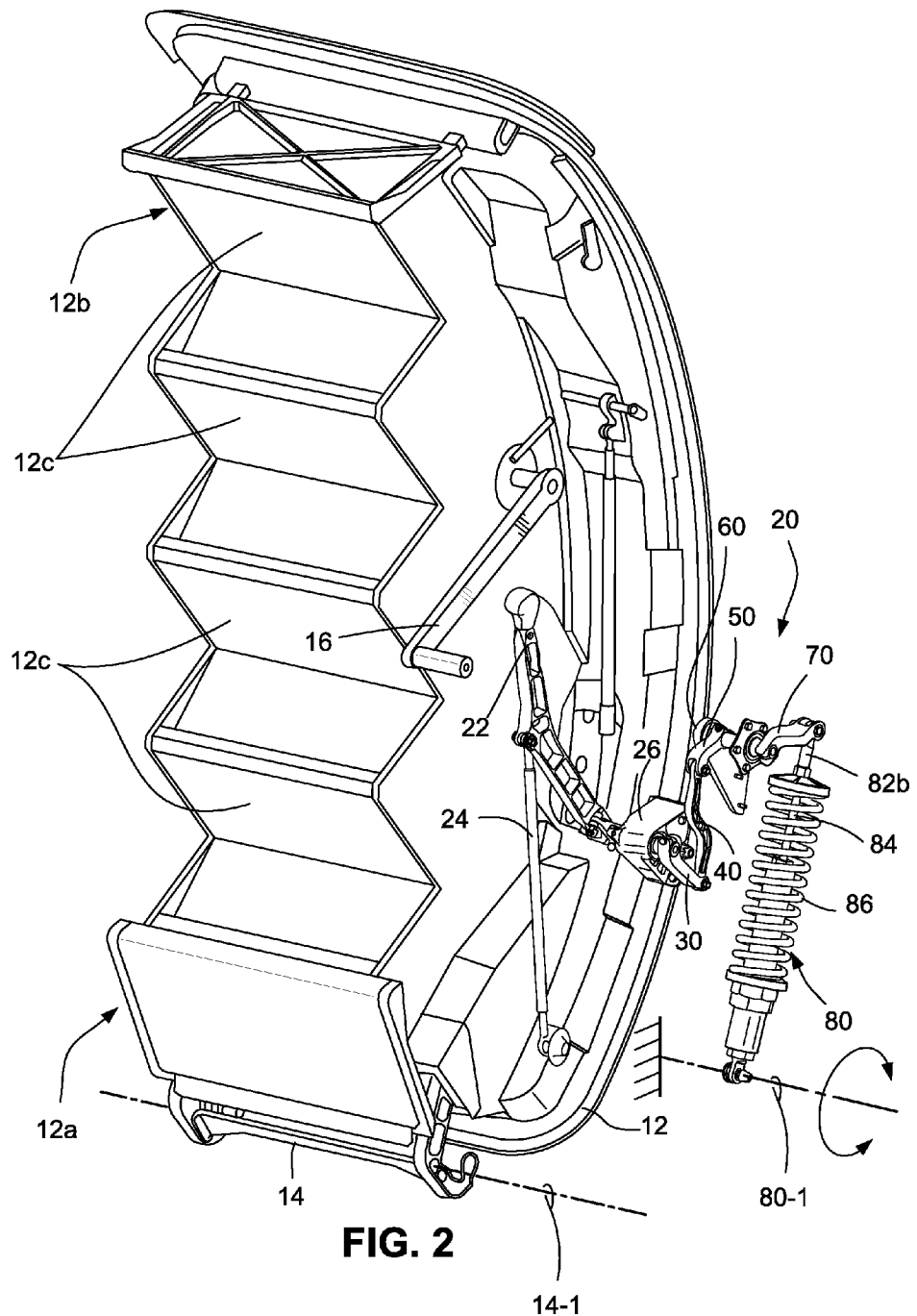
FIG. 2 is an interior perspective view of an airstair door equipped with a counterbalance mechanism according to an embodiment of the invention in a closed position.
Figure 3:
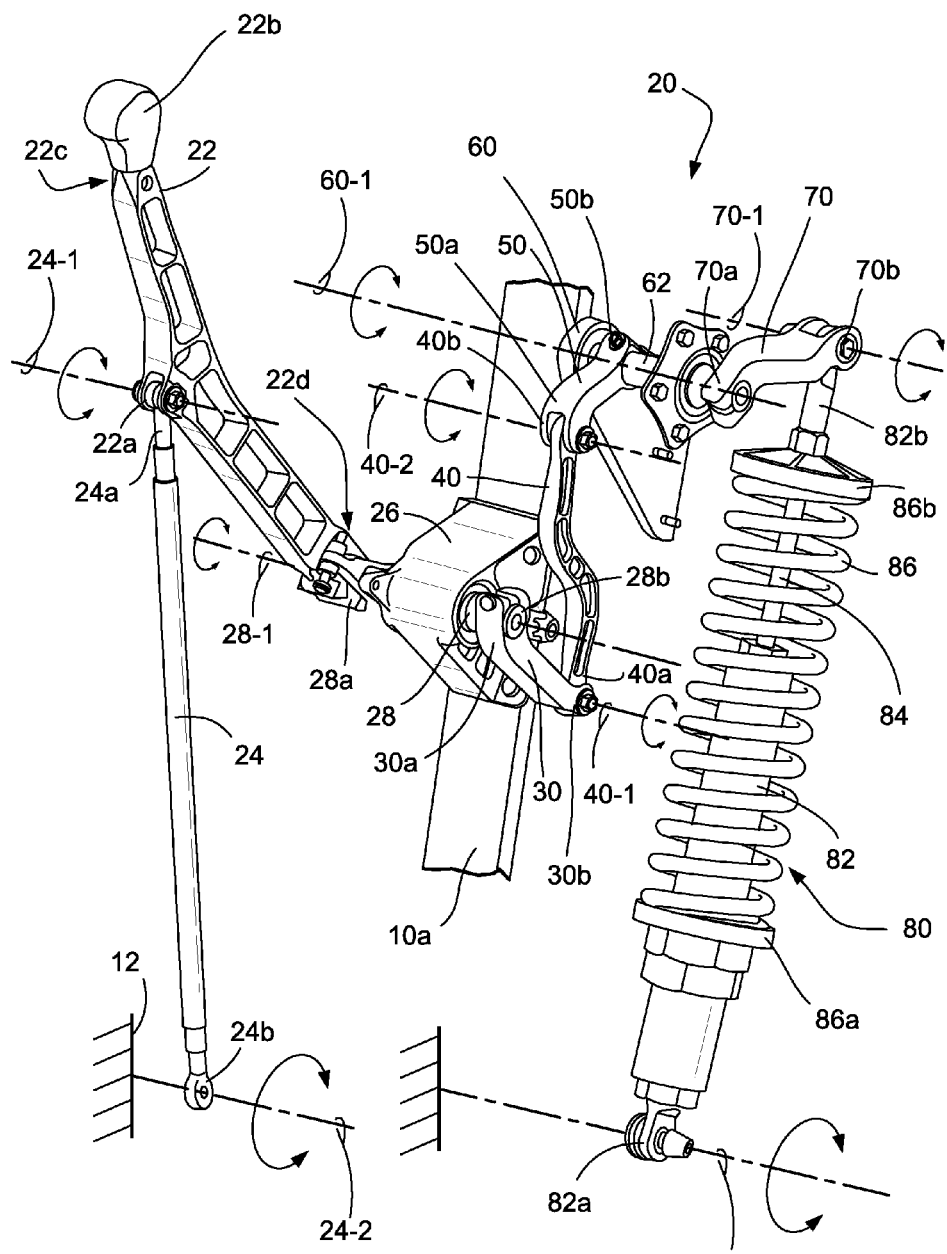
FIG. 3 is an enlarged interior perspective view of the counterbalance mechanism in a condition when the airstair door is in a closed position.
Figure 4:
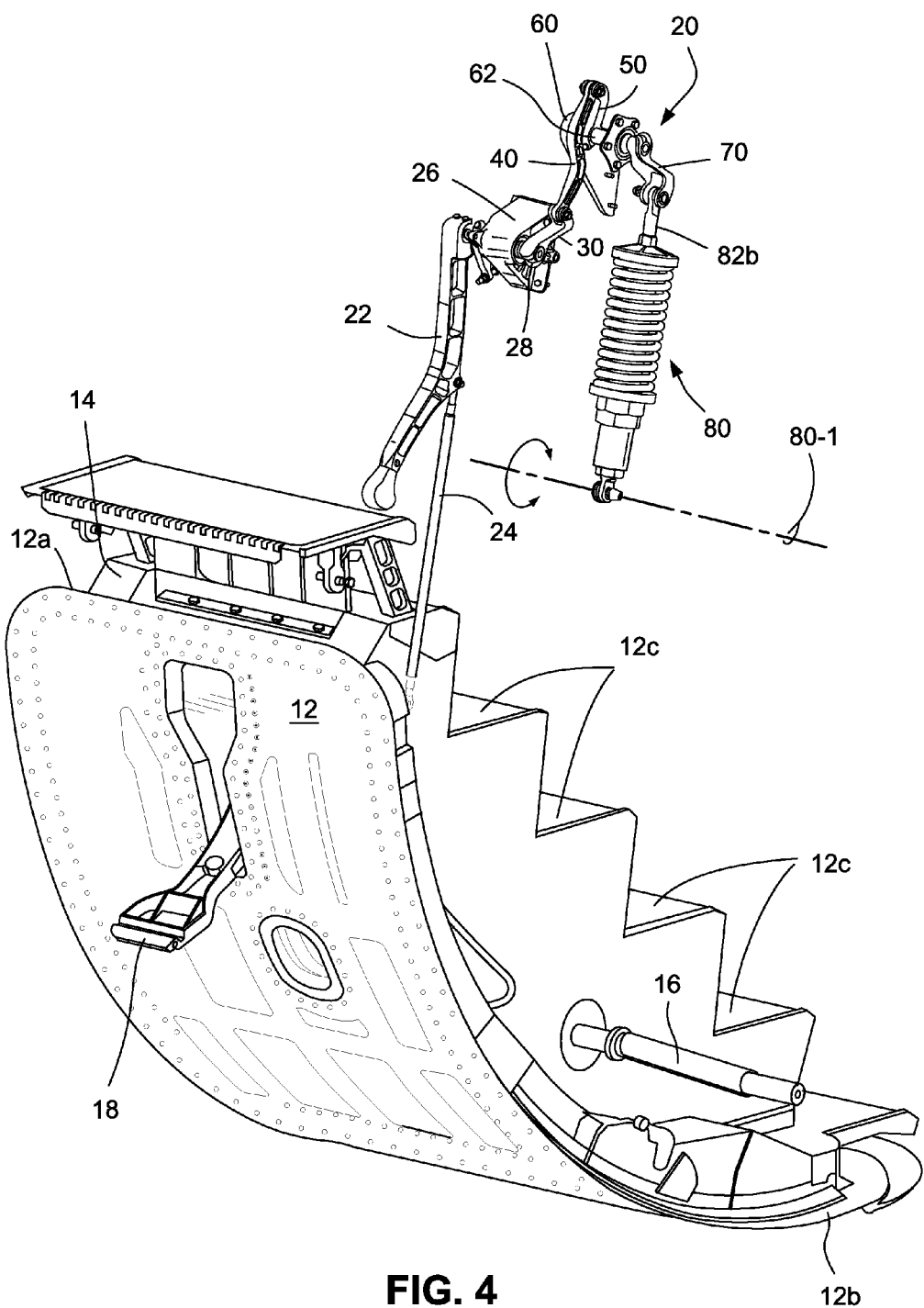
FIG. 4 is an interior perspective view of an airstair door equipped with a counterbalance mechanism according to an embodiment of the invention in an opened position.
Figure 5:
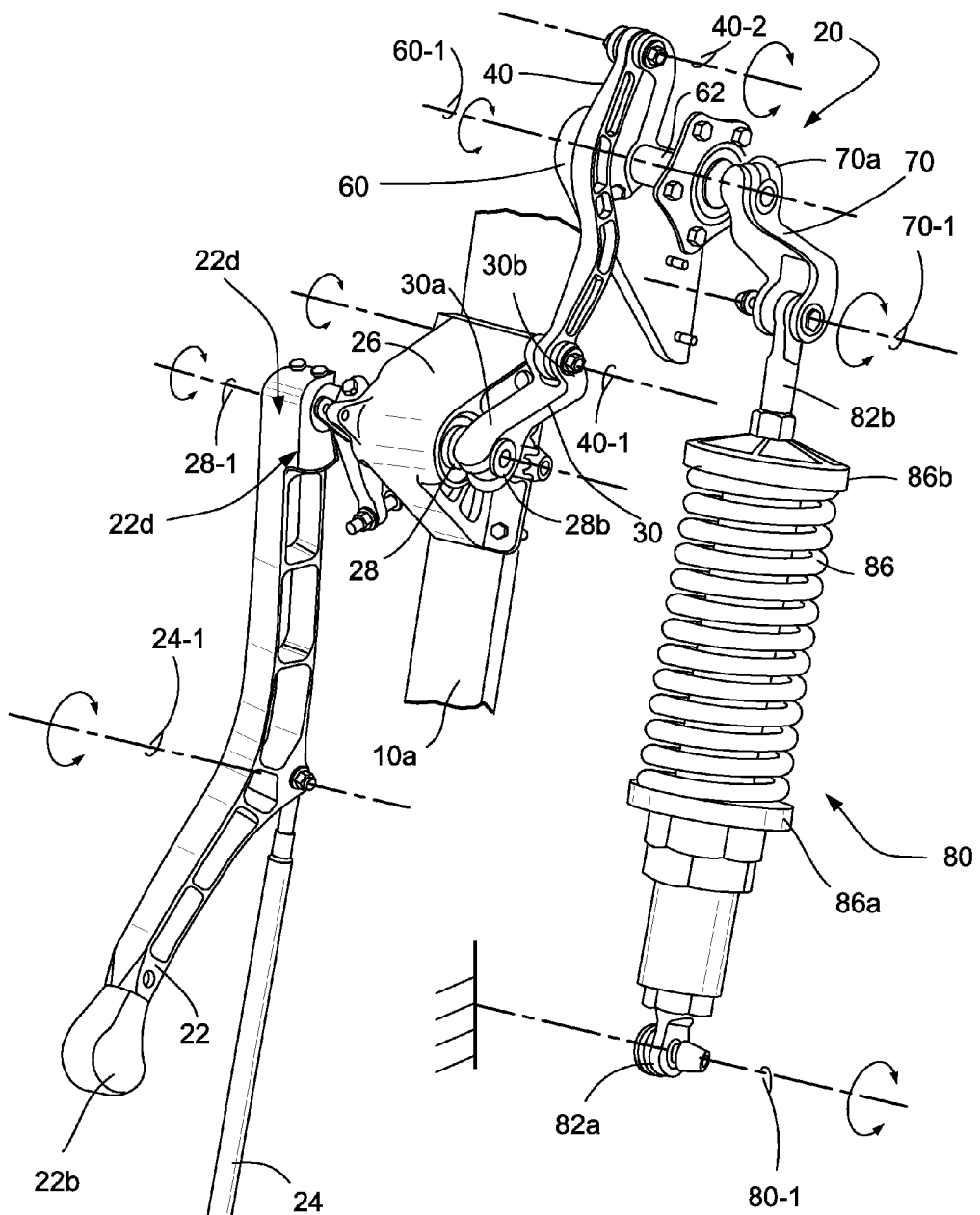
FIG. 5 is an enlarged interior perspective view of the counterbalance mechanism in a condition when the airstair door is in a opened position.

According to embodiments of the present invention, the airstair door 12 is operatively connected to a counterbalance mechanism 20 as will be described in greater detail with reference to accompanying FIGS. 2-5. In this regard, the counterbalance mechanism 20 is depicted in FIGS. 2-3 with the door 12 in a closed position (i.e., as shown in FIG. 1A), while the counterbalance mechanism 20 is depicted in FIGS. 4-5 with the door 12 in an opened position (i.e., as shown in FIG. 1B).

The counterbalance mechanism 20 includes an operator handle 22 which operatively connects the counterbalance mechanism 20 to the lower end 12a of the door 12 by a hoist rod 24. In this regard, the hoist rod 24 is pivotally connected at its upper end 24a to a connection boss 22a of the operator handle 22 located between the handle knob 22b at the free end 22c of the handle 22 and its opposite fixed end 22d thereby establishing an upper hoist rod pivot axis 24-1. The opposite lower end 24b of the hoist rod 24 is similarly pivotally connected to the lower end 12a of the door 12 to thereby establish a lower hoist rod pivot axis 24-2.

A lower bearing block 26 is fixed to the aircraft fuselage frame 10a adjacent the doorway entrance 11 (see FIG. 1B) and includes a lower bearing block shaft 28 which defines and rotates about a shaft axis 28-1. One end 28a of the bearing shaft 28 is fixed to the lower end 22d of the handle 22 while the opposite end 28b of the bearing shaft 28 is fixed to an end 30a of a first bellcrank 30. The opposite end 30b of bellcrank 20 is pivotally connected to one end 40a of a link arm 40 so as to be pivotal about a pivot axis 40-1. The opposite end 40b of the link arm 40 is pivotally connected to an end 50a of a second bellcrank 50 so as to be pivotal about pivot axis 40-2.

An upper bearing block 60 is fixed to aircraft fuselage frame 10a and includes an upper bearing block shaft 62 which defines and rotates about axis 60-1. The opposite end 50b of second bellcrank 50 and an end 70a of third bellcrank 70 are fixed to shaft 62 so each of bellcranks 60 and 70 rotate as an integral unit with the shaft 62 about the axis 60-1. The first, second and third bellcranks 30, 50 and 70, respectively, and their associated shafts 28 and 62 are thus connected by the linkage arm 40 to establish an inverse parallelogram linkage mechanism between the operator handle 22 and a force accumulator assembly 80 as will be described in greater detail below.

The force accumulator assembly 80 includes a piston assembly 82 having a piston rod 84. A lower end 82a of the piston 82 is pivotally connected to the aircraft fuselage frame 10a while an opposite end 82b of the piston rod 84 is pivotally connected to end 70b of the third bellcrank 70. The end 82a of the piston 82 is thus pivotal about the axis 80-1 while the end 82b of the piston rod 84 is pivotal about the axis 70-1. A compression spring 86 coaxially surrounds the piston 82 and piston rod 84 and is captured between lower and upper end caps 86a, 86b, respectively.

In use during a door opening cycle with the door 12 initially in the closed position as shown in FIGS. 1A, 2 and 3, an operator inside the fuselage 10 may operate the interior door release handle 16 or ground crew outside the aircraft may operate the exterior door release handle 18 so as to release the door and allow it to be pivoted about hinge 14 (arrow $A_D$ in FIG. 1A) to its opened position (see FIG. 1B). Once the door 12 has been released, the operator inside the fuselage 10 will then apply a generally downward counterclockwise force (as viewed from the right in FIGS. 2 and 3) on the handle 22 which will urge the door 12 to pivot about the hinge 14 by virtue of the hoist rod 24 being connected between the handle 22 and the door 12. This counterclockwise movement of the handle 22 will be translated into concurrent counterclockwise movement of the first bellcrank 30 about the axis 28-1 due to the fixed connection of the handle 22 and bellcrank 30 to bearing shaft 28 at their respective ends 22d and 30a.

The counterclockwise pivotal movement of the bellcrank 30 will in turn cause the second and third bellcranks 50, 70, respectively to pivot as a unit with the bearing shaft 62 in a clockwise direction about the shaft axis 60-1 (as viewed from the right of FIGS. 2 and 3) by virtue of the operative connection between the bellcranks 30 and 50 provide by link arm 40 (i.e., since the structures collectively form an inverse parallelogram linkage mechanism). The clockwise movement of the third bellcrank 70 will thus retract the piston arm 84 of the accumulator 80 against the force of the compression spring 86. Thus, as the door 12 pivots about the axis 14-1 (see FIG. 2) in the direction of arrow $A_D$ (see FIG. 1A), its weight and the force of gravity will be counterbalanced by the continual loading of spring force provided by the compression spring 86 thereby providing a continual mechanical counterbalance against such door weight.

The closure cycle of the door 12 when in the opened position as shown in FIGS. 1B, 4 and 5 is reverse to that described above. That is, with particular reference to FIGS. 4 and 5, an operator will manually apply a generally upward clockwise rotational force (as viewed from the right of FIGS. 4 and 5) to the handle 22 thereby provide a lifting force to the door by virtue of the hoist rod 24 being connected to the door 12. This movement of the handle 22 will in turn cause the bearing shaft 28 and the first bellcrank 30 to rotate in a clockwise direction thereby urging the bellcranks 50 and 70 to rotate as a unit with the shaft 62 in a counterclockwise direction by virtue of the link arm 40 being connected pivotally between the bellcranks 30 and 50 (i.e., since the structures collectively form an inverse parallelogram linkage mechanism). The counterclockwise movement of the third bellcrank 70 will thus cause the piston rod 84 to extend thereby unloading or dissipating the spring force that had previously been accumulated or loaded by the compression spring 86 during the door opening cycle of operation. The spring force of the compression spring 86 will thus provide force assistance as a mechanical counterbalance during the pivotal movement of the door 12 from its closed position to its open position (i.e., in a direction opposite to arrow $A_D$ in FIG. 1A).

Those skilled in this art will appreciate that various equivalent modifications and/or alterations may be made to the embodiment described above. For example, a tension spring or other similar biasing mechanisms may be employed instead of the compression spring 86 described previously, in which case the structures could be modified to accumulate the biasing force of such devices to yield similar and substantially equivalent functional effects to those described previously.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A counterbalance mechanism for counterbalancing weight of a bottom hinged door comprising:
   an operator handle;
   a hoist rod pivotally connected at one end to the operator handle and at an opposite end thereof to the door near a bottom region thereof;
   a force accumulator assembly including a force biasing member which accumulates and dissipates a bias force when opening and closing the door, respectively, to provide mechanical counterbalance to the weight of the door; and
   a bellcrank assembly operatively interconnecting the operator handle to the force accumulator as an inverse parallelogram linkage, wherein the bellcrank assembly includes a first bellcrank fixed to the operator handle, second and third bellcranks fixed to one another, and a link arm pivotally interconnecting the first and second bellcranks, wherein
   rotational movement of the operator handle in one of counterclockwise and clockwise directions is translated by the first bellcrank into rotational movement of the second and third bellcranks in clockwise and counterclockwise directions to thereby cause a loading and unloading of biasing force of the force biasing member, respectively.

2. The mechanism of claim 1, wherein the bellcrank assembly comprises a fixed-position lower bearing block having a lower bearing shaft, wherein an end of each of the operator handle and the first bellcrank is fixed to the lower bearing shaft so the operator handle and the first bellcrank rotate as a unit with one another and with the lower bearing shaft.

3. The mechanism of claim 1 or 2, wherein the bellcrank assembly comprises a fixed position upper bearing block having an upper bearing shaft, wherein respective ends of the second and third bellcranks are fixed to the upper bearing shaft so the second and third bellcranks rotate as a unit with one another and with the lower bearing shaft.

4. A method of providing weight counterbalancing for an aircraft door comprising installing in an aircraft having a bottom-hinged clamshell-type door a counterbalance mechanism as in claim 1, and operatively connecting the counterbalance mechanism to the aircraft door.

5. An aircraft door comprising a counterbalance mechanism as in claim 1.

6. An aircraft door as in claim 5, wherein the aircraft door is an airstair door.

7. The mechanism of claim 1, wherein the biasing member comprises a compression spring.

8. The mechanism of claim 7, wherein the compression spring is mounted between lower and upper spring caps.

9. The mechanism of claim 8, wherein the force accumulator comprises a piston assembly, and wherein the compression spring coaxially surrounds the piston assembly.

10. An aircraft comprising:
    a fuselage having a doorway entrance;
    a bottom hinged aircraft door for opening and closing the fuselage doorway entrance; and
    a counterbalance mechanism operatively interconnecting the aircraft door and the fuselage, wherein the counterbalance mechanism comprises:
    (i) an operator handle;
    (ii) a hoist rod pivotally connected at one end to the operator handle and at an opposite end thereof to the aircraft door near a bottom region thereof;
    (iii) a force accumulator assembly including a force biasing member which accumulates and dissipates bias force when opening and closing the door, respectively, to provide mechanical counterbalance to the weight of the door; and
    (iv) a bellcrank assembly operatively interconnecting the operator handle to the force accumulator as in inverse parallelogram linkage, wherein the bellcrank assembly includes a first bellcrank fixed to the operator handle, second and third bellcranks fixed to one another, and a link arm pivotally interconnecting the first and second bellcranks, wherein
    rotational movement of the operator handle in one of counterclockwise and clockwise directions is translated by the first bellcrank into rotational movement of the second and third bellcranks in clockwise and counterclockwise directions to thereby cause a loading and unloading of biasing force of the force biasing member, respectively.

11. The mechanism of claim 10, wherein the bellcrank assembly comprises a fixed-position lower bearing block having a lower bearing shaft, wherein an end of each of the operator handle and the first bellcrank is fixed to the lower bearing shaft so the operator handle and the first bellcrank rotate as a unit with one another and with the lower bearing shaft.

12. The mechanism of claim 10 or 11, wherein the bellcrank assembly comprises a fixed position upper bearing block having an upper bearing shaft, wherein respective ends of the second and third bellcranks are fixed to the upper bearing shaft so the second and third bellcranks rotate as a unit with one another and with the lower bearing shaft.

13. An aircraft door as in claim 10, wherein the aircraft door is an airstair door.

14. The mechanism of claim 10, wherein the biasing member comprises a compression spring.

15. The mechanism of claim 14, wherein the compression spring is mounted between lower and upper spring caps.

16. The mechanism of claim 15, wherein the force accumulator comprises a piston assembly, and wherein the compression spring coaxially surrounds the piston assembly.

17. A counterbalance mechanism for a bottom-hinged clamshell-type airstair door comprising:
    upper and lower bearing blocks having upper and lower bearing block shafts defining respective parallel upper and lower rotational axes, respectively;
    an operator handle and a first bellcrank fixed to the lower bearing block shaft such that the operating handle and first bellcrank rotate as a unit with one another and with the lower bearing block shaft about the lower rotational axis defined thereby;

second and third bellcranks fixed to the upper bearing block shaft such that the second and third bellcranks rotate as a unit with one another and with the upper bearing block shaft about the upper rotational axis defined thereby;

a link arm operatively connecting the first and second bellcranks such that rotational movement of the operator handle in one of counterclockwise and clockwise directions is translated by the first bellcrank into rotational movement of the second and third bellcranks in clockwise and counterclockwise directions, respectively; and a force accumulator assembly including a biasing spring which accumulates and dissipates bias force when opening and closing the door, respectively, to provide mechanical counterbalance to the weight of the door, wherein the force accumulator assembly is operatively connected to the third bellcrank such that rotational movement of the third bellcrank in one of the clockwise and counterclockwise directions responsively causes a spring biasing force to be loaded and unloaded, respectively, by the biasing spring.

18. The counterbalancing mechanism of claim 17, further comprising a hoist rod having one end pivotally connected to the operator handle and an opposite end pivotally connected to the airstair door.

19. An aircraft which comprises a bottom-hinged clamshell-type airstair door and a counterbalance mechanism as in claim 17 operatively connected to the airstair door.

20. A method of providing weight counterbalancing for an aircraft airstair door comprising installing in an aircraft having a bottom-hinged clamshell-type airstair door a counterbalance mechanism as in claim 17, and operatively connecting the counterbalance mechanism to the airstair door.

21. The counterbalancing mechanism of claim 17, wherein the biasing spring is a compression spring.

22. The counterbalancing mechanism of claim 21, wherein the force accumulator further comprising a piston assembly, and wherein the compression spring coaxially surrounds the piston assembly.

23. The counterbalancing mechanism of claim 22, wherein the force accumulator further comprises upper and lower end caps, wherein the compression spring is mounted between the upper and lower end caps.

* * * * *